Patented Aug. 19, 1952

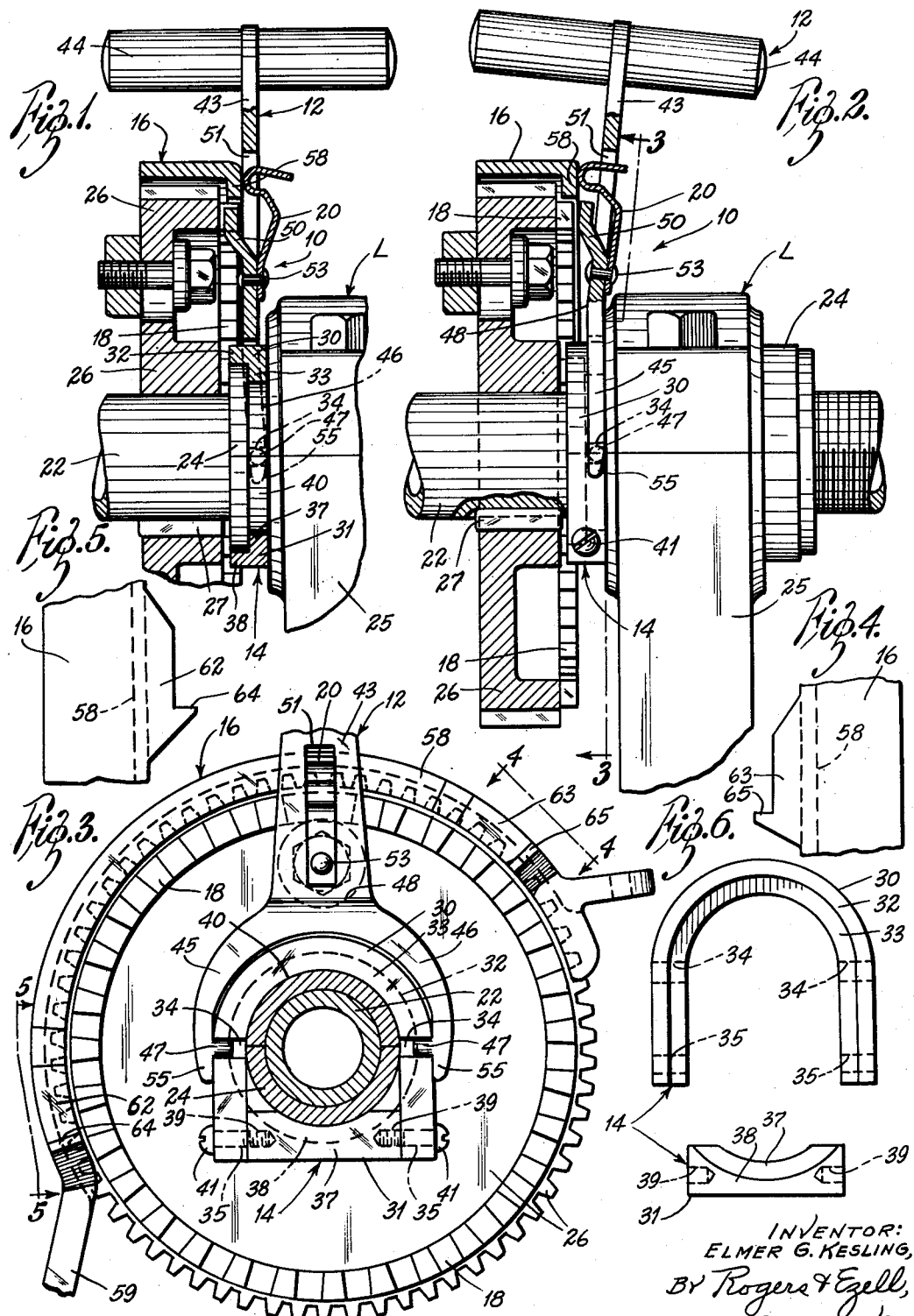

2,607,240

UNITED STATES PATENT OFFICE 2,607,240

LATHE ATTACHMENT

Elmer G. Kesling, Bloomfield, Mo., assignor of one-half to Gladys M. Kesling, Bloomfield, Mo.

Application January 16, 1950, Serial No. 138,843

10 Claims. (Cl. 74—548)

1

The present invention relates generally to lathes, and more particularly to a lathe attachment through the use of which the lathe spindle may be turned manually.

In general, lathes having underslung motors have no provision for turning or partially turning the spindle manually. The present invention overcomes this deficiency in such lathes, and, additionally, may be applied to any lathe.

In brief, the present novel lathe attachment includes an operating handle or lever which is mounted on a lathe adjacent the spindle for rotative movement about the rotational axis thereof and for pivotal movement of a limited type longitudinally of the spindle. An annular ring of notches or teeth is secured to the spindle driving gear for engagement by a projection or ratchet secured to or formed integral with the handle. The handle is normally spring-biased to a position in which its projection or ratchet is not in engagement with the notches or teeth, it being necessary to overcome the spring tension to manually engage the projection or ratchet with the notches or teeth by pivotal movement of the lever preparatory to rotating the handle in either direction for manual movement of the lathe spindle. Suitable release devices are provided to automatically disengage the projection or ratchet from the notches or teeth at predetermined points in the path of movement of the handle to guard against destruction of the present attachment and injury to personnel should the lathe inadvertently become power actuated while manual rotation of the spindle is being effected.

Therefore, an object of the present invention is to provide a novel attachment for lathes by which the spindles thereof may be manually rotated independently of the motor.

Another object is to provide a novel attachment for a lathe which facilitates manual rotation of the spindle thereof and which incorporates safety automatic release devices which prevent destruction of the attachment or injury to operating personnel should the lathe become power actuated while the spindle is being manually rotated.

Another object is to provide a novel attachment for a lathe through which the spindle thereof may be manually rotated which is normally maintained in inoperative disconnected position in respect to the lathe spindle, and which must be moved into engagement with elements rotatable by the spindle prior to manual rotation of the spindle, thereby substantially insuring against accidental movement of the spindle.

Other objects are to provide a novel attachment for a lathe by means of which the spindle thereof may be rotated which may be readily applied to a lathe already in operation or which may be incorporated as a part of standard construction thereof, which is simple in construction and in operation so that any lathe operator may readily employ the same with a minimum of instruction, which is of rugged construction thereby reducing to a minimum maintenance and replacement, which is relatively inexpensive, and which finds general adaptation to lathes for its intended function.

The foregoing and other objects and advantages are apparent from the following description taken with the accompanying drawing, in which:

Fig. 1 is a fragmentary, vertical, longitudinal cross-sectional view through a portion of a lathe to which is connected an attachment for manually rotating the spindle which incorporates the teachings of the present invention, the attachment being illustrated in operative position;

Fig. 2 is a view similar to Fig. 1, but illustrating the present attachment in inoperative position;

Fig. 3 is a vertical transverse cross-sectional view on substantially the line 3—3 of Fig. 2;

Fig. 4 is an enlarged fragmentary view on substantially the line 4—4 of Fig. 3;

Fig. 5 is an enlarged fragmentary view on substantially the line 5—5 of Fig. 3; and Fig. 6 is an exploded view of the bearing ring which supports the operating handle of the present novel attachment.

Referring to the drawing more particularly by reference numerals, 10 indicates generally a lathe attachment for manually rotating the spindle thereof. Broadly, the lathe attachment 10 includes an operating handle or lever 12, a composite bearing ring 14, a multi-function shield 16, a notch or tooth ring 18 secured to the spindle driving gear, and a spring 20.

Only essential parts and fragments of parts of a lathe L are shown in the drawing. The lathe L includes the usual spindle 22 mounted for rotation at the presently illustrated end in a bearing 24 mounted in a support 25. A driving gear 26 is secured to the spindle 22 by a suitable key 27.

More specifically considering the several parts of the present lathe attachment 10, the composite bearing ring 14 comprises a U-shaped element 30 and a straight element 31. The element 30 is of angular cross section, as is clear from Fig. 1, including joined portions 32 and 33. Opposed notches 34 are formed in the portion 32 on a diameter of the curved part of the element 30. Screw apertures 35 are formed in opposed relation in the legs of the element 30. The element 31 is of angular cross section, including joined portions 37 and 38, the upper side being arcuate. Opposed threaded screw receiving wells 39 are provided in the element 31.

The bearing ring 14 is disposed on the spindle bearing 24 with the annular part of the portion 33 of the element 30 and the portion 37 of the element 31 disposed in a circular groove 40 formed in the latter near the inner end thereof, as is clear from Fig. 1. The portions 32 and 38 of the elements 30 and 31, respectively, are directed inwardly to overlie the innermost portion of the spindle bearing 24, and the notches 34 open against the inner vertical face of the bearing support 25 for a purpose clearly pointed out below. Screws 41 secure the elements 30 and 31 together.

The operating handle 12 includes a flat shank 43 to the upper end of which is secured a hand grasp 44. At its lower end, the shank 43 includes integral arcuately divergent arms 45 and 46 to which are secured or formed integral therewith opposed inwardly directed ears or trunnions 47. The shank 43 is bent at 48 for a purpose described below. A projection 50 is struck from the plane of the shank 43, being of the configuration shown in the drawing. An opening 51 is formed in the shank 43 by striking the projection 50 which is enlarged to permit passage through the shank 43 of the spring 20 secured to the shank 43 by a rivet 53 or the like. The free ends of the arms 45 and 46 are bent inwardly at a small degree at 55, or are rounded off to produce the same effect.

The arms 45 and 46 of the shank 43 straddle the arcuate portion of the element 30 of the bearing ring 14, the inwardly projecting ears 47 being disposed in the notches 34. It is to be observed that the ears 47 are trapped in the notches 34, being disposed therein prior to assembly of the composite bearing ring 14 on the spindle bearing 24. The inner face of the spindle bearing support 25 thus closes the notches 34 to trap the ears 47 thereby providing a pivotal mount for the operating handle 12. The bends 55 at the free ends of the arms 45 and 46 permit pivotal movement of the operating arm 12 from the position of Fig. 2 to the position of Fig. 1.

The notched or toothed ring 18 is welded, bolted, or otherwise secured to the outer face of the driving gear 26 in opposed relation to the projection 50. Normally, the projection 50 is free of the notches or teeth of the annular ring 18 (Fig. 2). The ring 18 may be integral with the gear 26.

The shield 16 is arcuate in form and extends around a little more than half the circumference of the driving gear 26. The shield 16 includes a flange 58 against which a portion of the spring 20 rests at all times. The shield 16 includes a supporting arm 59, the lower attaching end of which is broken away for conservation of space, it being understood that the lower attaching end (not shown) of the supporting arm is secured to a suitable part of the lathe L.

Releasing cams 62 and 63 are provided at the opposite ends of the shield 16, extending outwardly from the flange 58 thereof for the purpose of automatically releasing the projection 50 from the ring 18 should the driving gear 26 be power actuated during use of the lathe attachment 10, and for limiting the operating reach of the attachment 10. Right angle stop shoulders 64 and 65 are formed adjacent the cams 62 and 63, respectively. The shank 43 engages the cams 62 and 63 and the shoulders 64 and 65, respectively, to effect disengagement of the projection 50. The cams 62 and 63 and the shoulders 64 and 65 may be formed integral with or be secured to the shield 16.

*Operation*

The present lathe attachment 10 is assembled as indicated above, the ears 47 being disposed in the notches 34 before the elements 30 and 31 forming the composite bearing 14 are slipped into position about the bearing 24. The screws 41 are fed through the openings 35 in the element 30 and into the threaded wells 39 of the element 31 to mount the bearing ring 14 in the groove 40 of the bearing 24, permitting rotation of the former on the latter.

The inoperative position of the lathe attachment 10 is shown in Fig. 2, the spring 20 bearing against the flange 58 maintaining the projection 50 out of engagement with the notches of the ring 18, the diverging arms 45 and 46 being disposed substantially flat against the inner face of the support 25. The bend 48 permits minimum distance between the arms 45 and 46 and the ring 18. When it is desired to manually rotate the spindle 22 of the lathe L, the shank 43 is pivoted inwardly, or to the left in the drawing, until the projection 50 is in engagement with a notch of the ring 18, the force of the spring 20 being overcome in this action. The spindle 22 may then be rotated in either direction by movement of the shank 43 in the desired direction of movement, the bearing ring 14 rotating on the bearing 24 to permit this movement. If it is desired to move the spindle 22 manually a greater distance than that between the cams 62 and 63, the shank 43 may be readily returned to a new starting position after release of the projection 50 from the engaged notch of the ring 18, and the foregoing repeated.

Should the driving gear 26 become power actuated while a manual operation is in progress, one of the cams 62 and 63 will automatically disengage the lathe attachment 10 as it is reached by the shank 43 which will ride upon the respective camming surface. The respective shoulders 64 and 65 will positively prevent reengagement of the projection 50 with the ring 18.

Manifestly, the configuration of the several elements and parts of the presently disclosed lathe attachment 10 may be changed or modified for particular installations, and in respect to a single installation. It is also clear that the present lathe attachment 10 fulfills the advantages and objects sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A lathe attachment for turning a lathe spindle independently of the lathe power comprising an operating member, means movably supporting said member on a lathe, means for releasably connecting said member with a lathe spindle for rotation of the spindle by said operating member, means for normally maintaining said releasable connecting means inoperative, and cam means for positively enforcing release of said releasable connecting means and for positively maintaining the same released at a predetermined stage of movement of said operating member.

2. A lathe attachment for turning a lathe spindle independently of the lathe power comprising an operating member, means movably mounting said operating member on a lathe, engageable means mounted on said lathe for movement with the lathe spindle, means for releasably connecting said operating member with said engageable means for rotative movement of the lathe spindle by said operating member independently of the lathe power, and cam means for positively enforcing disconnection of said operating member from said engageable means upon the occurrence of predetermined movement of said operating member.

3. A lathe attachment for turning a lathe spindle independently of the lathe power comprising an operating member, means movably mounting said operating member on a lathe, engageable means mounted on said lathe for movement with the lathe spindle, means for releasably connecting said operating member with said engageable means for rotative movement of the lathe spindle by said operating member independently of the lathe power, means normally maintaining said operating member disconnected from said engageable means, and cam means for positively enforcing disconnection of said operating member from said engageable means and for positively maintaining the former released upon the occurrence of predetermined movement of said operating member.

4. A lathe attachment for turning the spindle of a lathe comprising a bearing ring rotatably mounted upon a lathe, an operating member pivotally mounted upon said bearing ring for movement therewith and having a projection secured thereto, a toothed ring secured to the spindle driving gear of the lathe for rotation therewith in position for engagement by said projection, and stationary spaced cam elements mounted on said lathe in line of movement of said operating member for automatic disconnecting of said projection from said toothed ring.

5. A lathe attachment for turning the spindle of a lathe comprising a bearing ring rotatably mounted upon a lathe, an operating member pivotally mounted upon said bearing ring for movement therewith and having a projection secured thereto, a toothed ring secured to the spindle driving gear of the lathe for rotation therewith in position for engagement by said projection, resilient means normally maintaining said operating member in inoperative position, stationary spaced cam elements mounted on said lathe in line of movement of said operating member for automatic disconnecting of said projection from said toothed ring and for maintaining said projection disconnected from said toothed ring, and stop shoulders adjacent said cam elements for limiting rotational movement of said operating member.

6. A lathe attachment for turning the spindle of a lathe comprising a bearing ring rotatably mounted upon a lathe, an operating member pivotally mounted upon said bearing ring for movement therewith and having a projection secured thereto, a toothed ring secured to the spindle driving gear of the lathe for rotation therewith in position for engagement by said projection, a shield secured to the lathe over a portion of the spindle driving gear including an arcuate flange, a spring secured to said operating member and engaging said arcuate flange biasing said operating member to inoperative position, spaced cam elements secured to said flange for engagement by said operating member to automatically disengage said projection from said toothed ring and for maintaining said projection disconnected from said toothed ring, and stop shoulders adjacent said cam elements for limiting rotational movement of said operating member.

7. A lathe attachment for turning a lathe spindle independently of the lathe power comprising an operating member, means movably supporting said member on a lathe, means for releasably connecting said member with a lathe spindle for rotation of the spindle by said operating member, means for positively enforcing release of said releasable connecting means upon movement of said operating member to a predetermined position, and means for positively maintaining the releasable connecting means released.

8. A lathe attachment for turning a lathe spindle independently of the lathe power comprising an operating member, means movably supporting said member on a lathe, means for releasably connecting said member with a lathe spindle for rotation of the spindle by said operating member, means for positively enforcing release of said releasable connecting means upon movement of said operating member to a predetermined position, means for positively maintaining the releasable connecting means released, and means for positively limiting the rotary movement of said operating member.

9. A lathe attachment for turning a lathe spindle independently of the lathe power comprising an operating member, means movably mounting said operating member on a lathe, engageable means mounted on said lathe for movement with the lathe spindle, means for releasably connecting said operating member with said engageable means for rotative movement of the lathe spindle by said operating member independently of the lathe power, cam means for positively enforcing disconnection of said operating member from said engageable means upon the occurrence of predetermined movement of said operating member, and stop shoulder means adjacent said cam means for limiting the rotary movement of said operating member.

10. A lathe attachment for turning a lathe spindle independently of the lathe power comprising an operating member, means movably mounting said operating member on a lathe, engageable means mounted on said lathe for movement with the lathe spindle, means for releasably connecting said operating member with said engageable means for rotative movement of the lathe spindle by said operating member independently of the lathe power, means normally maintaining said operating member disconnected from said engageable means, cam means for positively enforcing disconnection of said operating member from said engageable means and for positively maintaining the former released upon the occurrence of predetermined movement of said operating member, and stop shoulder means adjacent said cam means for limiting the rotary movement of said operating member.

ELMER G. KESLING.

REFERENCES CITED

The following references are of record in the file of this patent:

UNITED STATES PATENTS

| Number | Name | Date |
|---|---|---|
| 113,776 | Kirkham | Apr. 18, 1871 |
| 408,291 | Bullard | Aug. 6, 1889 |
| 1,098,189 | Stocker | May 26, 1914 |
| 1,115,652 | Clarke | Nov. 3, 1914 |
| 1,851,307 | Hazelton | Mar. 29, 1932 |
| 2,227,696 | Blaylock | Jan. 7, 1941 |
| 2,239,941 | Soulary | Apr. 29, 1941 |
| 2,447,574 | Gibbons | Aug. 24, 1948 |